("(12) United States Patent" "Ko et al.")

(10) Patent No.: US 11,597,345 B2
(45) Date of Patent: *Mar. 7, 2023

(54) DRIVER AIR BAG APPARATUS FOR VEHICLE

(71) Applicant: HYUNDAI MOBIS CO., LTD., Seoul (KR)

(72) Inventors: Seok Hoon Ko, Yongin-si (KR); Min June Song, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,189

(22) Filed: Aug. 23, 2021

(65) Prior Publication Data

US 2022/0063548 A1 Mar. 3, 2022

(30) Foreign Application Priority Data

Sep. 3, 2020 (KR) .................. 10-2020-0112323
Sep. 3, 2020 (KR) .................. 10-2020-0112324

(51) Int. Cl.
*B60R 21/203* (2006.01)
*B60R 21/215* (2011.01)
(Continued)

(52) U.S. Cl.
CPC ........ *B60R 21/2338* (2013.01); *B60R 21/203* (2013.01); *B60R 21/2035* (2013.01);
(Continued)

(58) Field of Classification Search
CPC ............ B60R 21/203; B60R 21/215; B60R 21/21656; B60R 21/2346; B60R 21/2165; B60R 21/2035; B60R 21/2037; B60R 21/2176; B60R 21/205; B60R 21/2155; B60R 21/216; B60R 21/261; B60R 21/2334; B60R 11/0229; B60R 11/0235; B60R 11/0258; B60R 11/0264; B60R 2011/001; B60R 2011/005; B60R 2021/23566; B60R 2021/161; B60R 2021/2173
(Continued)

(56) References Cited

FOREIGN PATENT DOCUMENTS

DE          19911682 A1 *  9/2000  ............. B60R 21/05
KR   1020120044831 A     5/2012
WO   WO-2020260364 A1 * 12/2020  ........... B60R 21/203

* cited by examiner

*Primary Examiner* — Keith J Frisby
(74) *Attorney, Agent, or Firm* — NovoTechIP International PLLC

(57) ABSTRACT

A driver airbag apparatus for a vehicle is proposed. The driver airbag apparatus includes: the driver airbag apparatus being located at a rear of a steering wheel having an obstacle and configured to be deployed forward of the steering wheel while avoiding the obstacle, an airbag cushion configured to be deployed forward of the steering wheel via a gap between the obstacle and the steering wheel when gas is supplied thereinto; a gas injector located below the airbag cushion and configured to inject the gas into the airbag cushion via a gas outlet; and a diffuser configured to be deployed in the airbag cushion, and covering a part or all of the gas outlet from above the gas outlet and being open at a front portion thereof so as to guide the gas injected via the gas outlet to flow in front of an occupant.

18 Claims, 13 Drawing Sheets

(51) Int. Cl.
*B60R 21/2346* (2011.01)
*B60R 21/2165* (2011.01)
*B60R 21/2338* (2011.01)
*B60R 21/16* (2006.01)

(52) U.S. Cl.
CPC ........ *B60R 21/215* (2013.01); *B60R 21/2165* (2013.01); *B60R 21/21656* (2013.01); *B60R 21/2346* (2013.01); *B60R 2021/161* (2013.01)

(58) Field of Classification Search
USPC .................................. 280/728.2, 731, 728.3
See application file for complete search history.

DRIVER AIR BAG APPARATUS FOR VEHICLE

CROSS-REFERENCE TO RELATED APPLICATIONS

The present application claims priority to Korean Patent Application No. 10-2020-0112323, filed Sep. 3, 2020, and to Korean Patent Application No. 10-2020-0112324, filed Sep. 3, 2020. Each of these applications is incorporated by reference herein in its entirety.

BACKGROUND OF THE INVENTION

1. Field of the Invention

The present invention relates to a driver airbag apparatus for a vehicle and, more particularly, to a driver airbag apparatus having an airbag cushion, which is located at a rear of a steering wheel having a display device and is deployed forward of an occupant during deployment of the airbag cushion.

2. Discussion of Related Art

As a method to protect the safety of vehicle occupants, various types of airbag devices are provided in a vehicle. Among them, the driver airbag apparatus is mounted on a steering wheel.

The driver airbag apparatus is configured as follows. The driver airbag apparatus receives a control signal from an airbag control unit, and when an inflator explodes, an airbag cushion is ejected from the steering wheel by the pressure of airbag gas injected from the inflator to be deployed toward a driver. Therefore, the upper body of the driver is protected by the deployed airbag cushion.

When an autonomous driving situation in which a vehicle finds its own destination without the driver directly operating a steering wheel, an accelerator pedal, and a brake is realized, during vehicle driving, the driver may select a relaxation mode in which the driver takes a rest without directly driving the vehicle. A display device may be provided on the steering wheel for a comfortable rest of the driver in the relaxation mode.

However, when a vehicle accident occurs, the driver airbag cushion is ejected forward of the display device and is deployed toward the driver. When the airbag cushion is deployed while damaging the display device, the driver may be injured due to scattering of fragments of the display device.

In order to solve the above problem, the structure in which the airbag cushion is deployed while avoiding the display device during deployment has been developed, but it is difficult to deploy the airbag cushion in the desired direction.

The foregoing is intended merely to aid in the understanding of the background of the present invention, and is not intended to mean that the present invention falls within the purview of the related art that is already known to those skilled in the art.

BRIEF SUMMARY OF THE INVENTION

Accordingly, the present invention has been made keeping in mind the above problems occurring in the related art, and the present invention is intended to deploy an airbag cushion forward of an occupant during a vehicle accident by coupling a diffuser, which is located in the airbag cushion and guides a flow direction of gas, to the airbag cushion.

A driver airbag apparatus for a vehicle according to the present invention, the driver airbag apparatus being located at a rear of a steering wheel having an obstacle at a center portion of the steering wheel and configured to be deployed forward of the steering wheel while avoiding the obstacle, the driver airbag apparatus including: an airbag cushion configured to be deployed forward of the steering wheel via a gap between the obstacle and the steering wheel when gas is supplied thereinto; a gas injector located below the airbag cushion and configured to inject the gas into the airbag cushion via a gas outlet; and a diffuser configured to be deployed in the airbag cushion, and covering a part or all of the gas outlet from above the gas outlet and being open at a front portion thereof so as to guide the gas injected via the gas outlet to flow in front of an occupant.

The diffuser may include a first folded portion formed such that, a first end of the diffuser may be folded toward a second end thereof to superimpose a part or all thereof above the gas outlet, and opposite side ends of the first folded portion in a folded direction may be combined, respectively, and the first folded portion may be configured to be deployed toward a front portion of the airbag cushion during deployment of the airbag cushion.

The diffuser may include a second folded portion of which a second end of the diffuser may be folded toward a first end thereof, and the second folded portion may be deployed upwardly of the gas outlet during deployment of the airbag cushion.

The second folded portion may be formed such that, opposite side portions thereof may be extended outward from a longitudinal direction of the diffuser, so an end thereof may be extended relatively longer than a transversal length thereof, and during deployment of the second folded portion, the second folded portion may be expanded by a flow of the gas and be configured to guide a flow direction of the gas to flow in front of the occupant.

The opposite side ends of the second folded portion may be combined in a folded state so that an inner space of the second folded portion may be formed in a dome shape.

The diffuser may include a first folded portion formed such that, a first end thereof may be folded toward a second end thereof to superimpose a part or all thereof above the gas outlet, and opposite side ends thereof in a folded direction may be combined, respectively, the diffuser including a second folded portion of which the second end thereof may be folded toward the first end thereof, and an end of the first folded portion and an end of the second folded portion may be spaced apart from each other in a longitudinal direction of the diffuser.

The diffuser may be deployed at the same time as deployment of the airbag cushion as a side portion of a second end thereof may be connected to an upper side portion of the airbag cushion.

A first end of the diffuser may be deployed to correspond to a height of the obstacle and a second end thereof may be deployed upwardly in the airbag cushion.

The diffuser may include a gas inlet between a first end and a second end thereof to allow the gas outlet to be inserted into the gas inlet, and the diffuser may be coupled to the airbag cushion above the gas inlet.

The obstacle located at the center portion of the steering wheel may be a display device mounted to the steering wheel.

The driver airbag apparatus may include: an airbag housing located at a rear of the steering wheel and having an inner storage space for storing the airbag cushion therein and a top opening exposing the inner storage space; and an airbag cover located on the airbag housing to cover an upper surface of the airbag housing, and configured such that a front end thereof may be rotated upwardly on a rear end thereof during deployment of the airbag cushion, and including sidewalls extended downward on both side portions thereof in order to prevent sideways deployment of the airbag cushion.

The airbag cover may include a coupling portion extended downward from a rear end of the airbag cover and coupled to the airbag housing.

The airbag cover may include a hinge portion, which may be located at an upper portion of the coupling portion and be configured to rotate the airbag cover to allow a front end of the airbag cover to be moved upwardly during deployment of the airbag cushion.

The sidewalls may be rotated around the airbag housing while being inserted in the airbag housing, and interference between the sidewalls and the airbag housing may be prevented when the sidewalls are rotated relative to the airbag housing.

The airbag cover may further include a reinforcement portion reinforcing coupling between the sidewalls and the airbag cover.

The airbag cover may be configured to prevent the airbag cushion from being deployed rearward from the steering wheel during deployment of the airbag cushion, and to introduce deployment of the airbag cushion in front of the steering wheel.

The airbag cover may further include a tear line, which may be extended in a longitudinal direction of the vehicle and be located outside the sidewalls, so that the airbag cover may be cut during deployment of the airbag cushion.

The airbag cover may further include locking protrusions located on an outside surface of the sidewalls and extended downward and of which an end protrudes outward, the airbag housing may have locking grooves for the locking protrusions to be inserted into the locking grooves, and the locking protrusions may be inserted into the locking grooves to fix the airbag cover, and when the airbag cushion is deployed, the locking protrusions and the locking grooves may be released from a coupled state.

According to the present invention, the driver airbag apparatus for a vehicle has the airbag cushion that is deployed while avoiding the display device, so that safety of the driver or the occupant can be secured.

The diffuser that guides a flow direction of gas is mounted in the airbag cushion to guide the flow direction of the gas toward the occupant. Accordingly, the airbag cushion can be rapidly deployed toward the occupant.

The airbag cover covering the upper portion of the airbag housing has the sidewalls extended downward from both side portions thereof. Accordingly, the sidewalls prevent the airbag cushion from being deployed in a transversal direction of the vehicle, so that the airbag cushion can be rapidly deployed toward the occupant.

The airbag cushion is deployed via the gap between an obstacle and the steering wheel, thereby being located in front of the occupant while avoiding the obstacle. Accordingly, damage and scattering of fragments of the obstacle due to deployment of the airbag cushion can be prevented.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
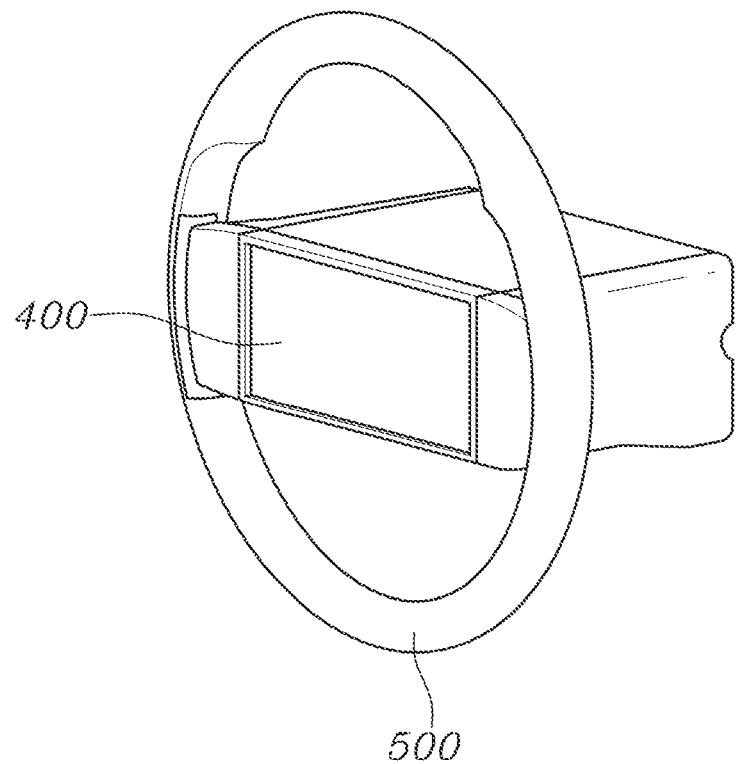
FIG. 1 is a front view showing a steering wheel having an obstacle in a driver airbag apparatus for a vehicle according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

An embodiment described herein may be changed in various ways and various shapes, so specific embodiments are shown in the drawings and will be described in detail in this specification. However, it should be understood that the exemplary embodiment according to the concept of the present invention is not limited to the embodiment which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, exemplary embodiments will be described hereafter in detail with reference to the accompanying drawings. Like reference numerals given in the drawings indicate like components.

Figure 2:
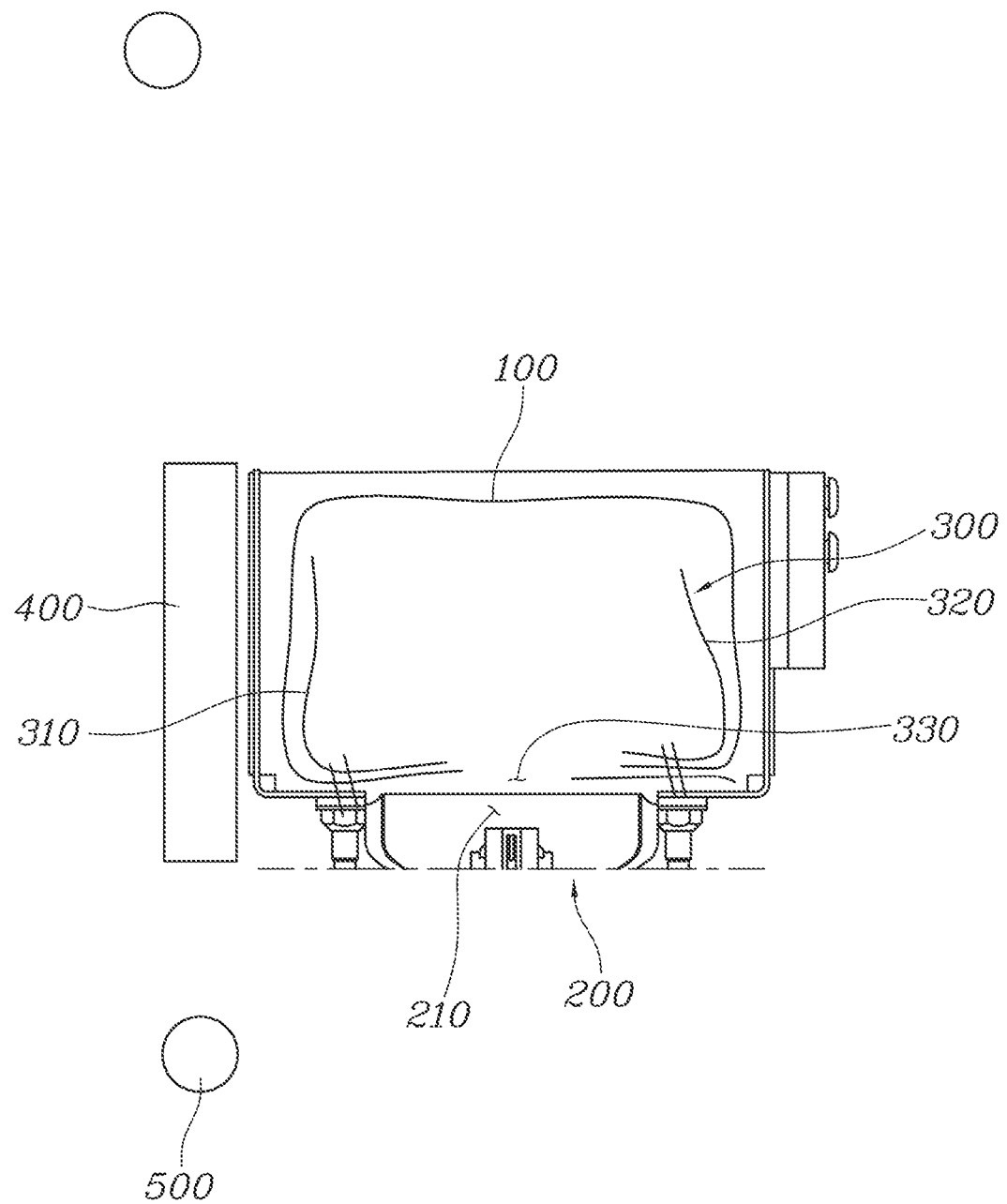
FIG. 2 is a longitudinal sectional view showing the driver airbag apparatus for a vehicle according to a first embodiment of the present invention.
Figure 3:
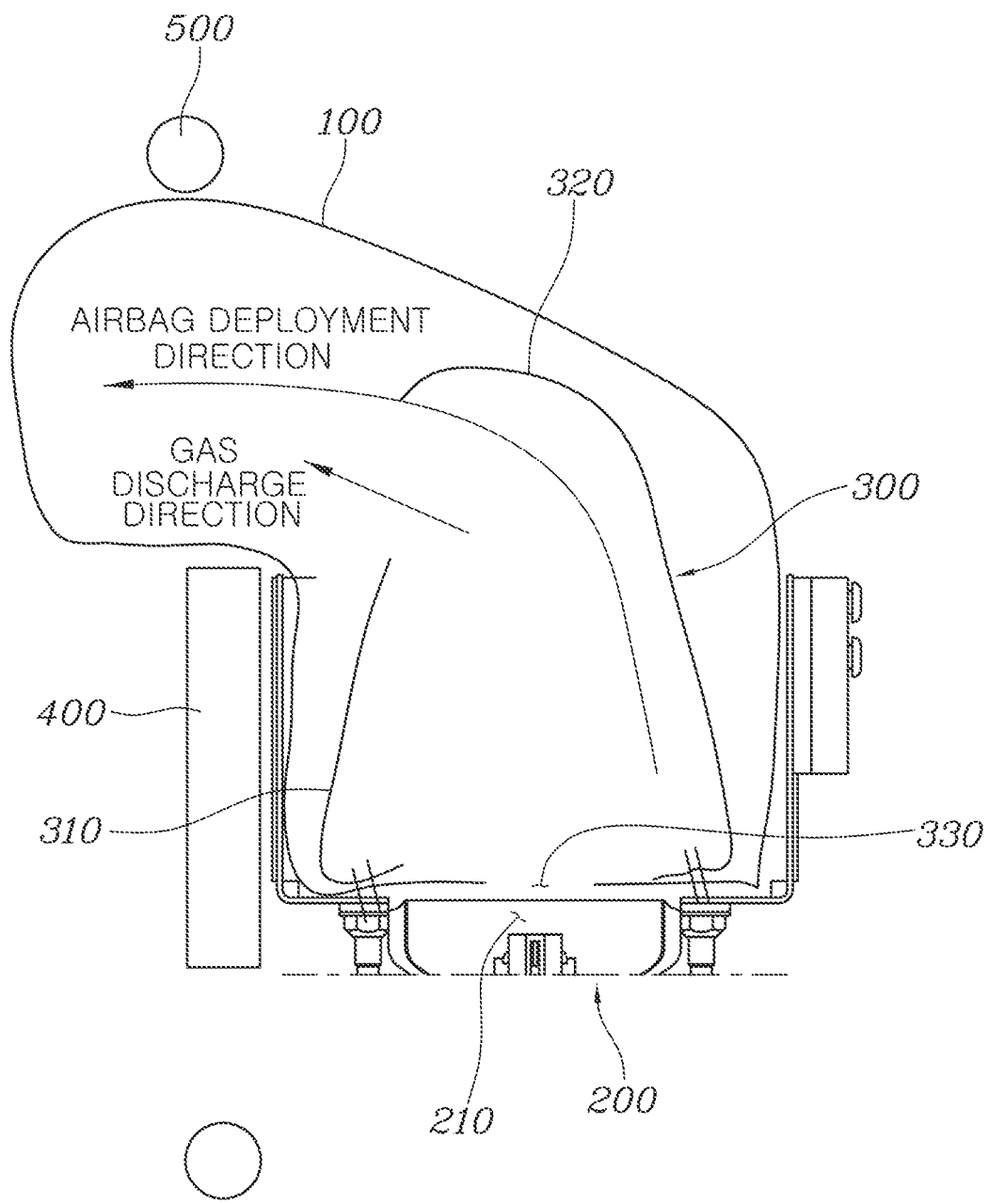
FIG. 3 is a longitudinal sectional view showing a first embodiment when the driver airbag apparatus for a vehicle according to the first embodiment of the present invention is deployed.
Figure 4:
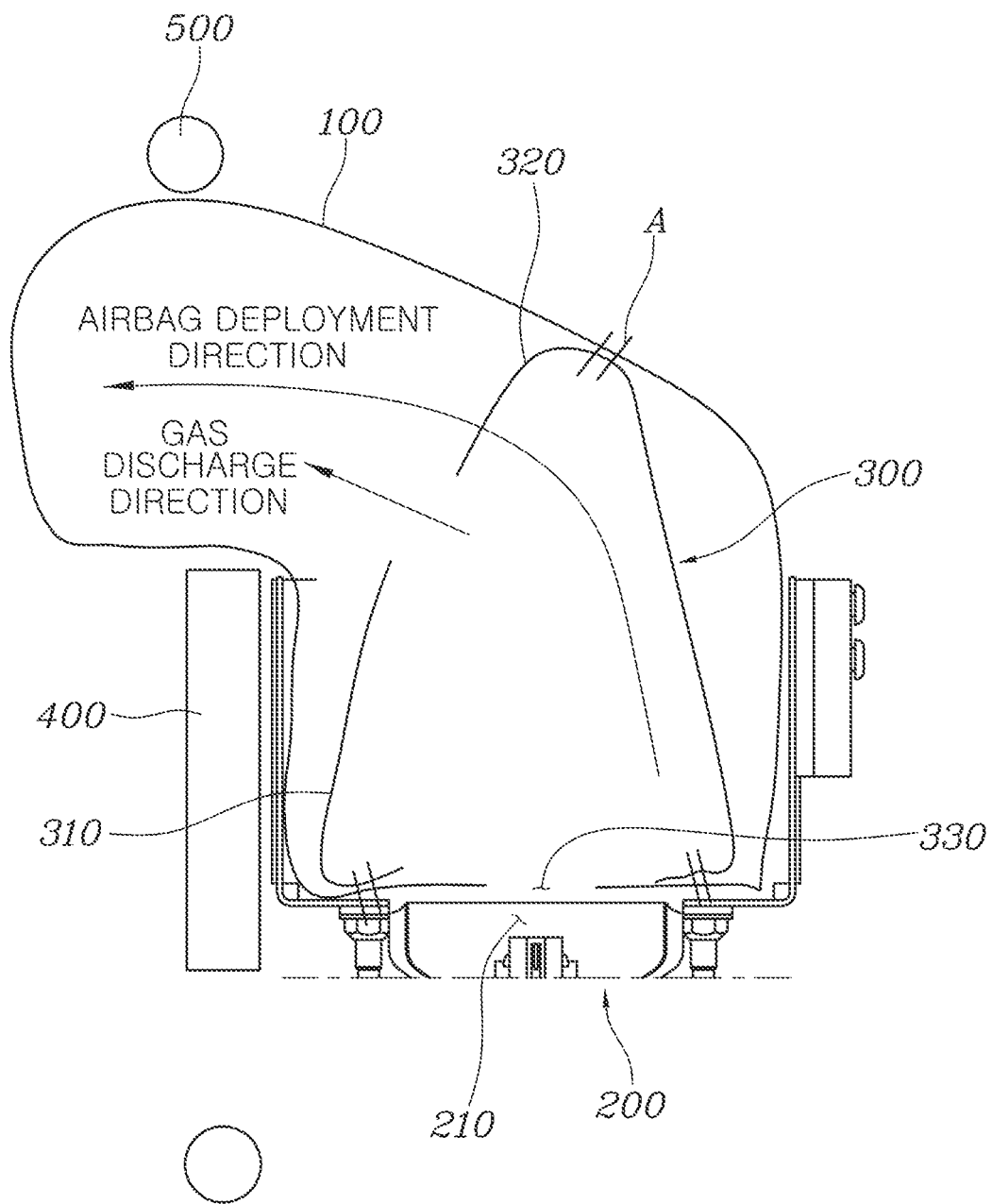
FIG. 4 is a longitudinal sectional view showing a second embodiment when the driver airbag apparatus for a vehicle according to the first embodiment of the present invention is deployed.

FIG. 1 is a front view showing a steering wheel 500 having an obstacle 400 in a driver airbag apparatus for a vehicle according to an embodiment of the present invention. FIG. 2 is a longitudinal sectional view showing the driver airbag apparatus for a vehicle according to the embodiment of the present invention. FIG. 3 is a longitudinal sectional view showing a first embodiment when the driver airbag apparatus for a vehicle according to the embodiment of the present invention is deployed. FIG. 4 is a longitudinal sectional view showing a second embodiment when the driver airbag apparatus for a vehicle according to the embodiment of the present invention is deployed.

Hereinbelow, the driver airbag apparatus for a vehicle according to preferred embodiment of the present invention will be described with reference to accompanying FIGS. 1 to 7.

According to the present invention, the driver airbag apparatus for a vehicle, which is located at a rear of the steering wheel 500 having the obstacle 400 at a center portion of the steering wheel and configured to be deployed forward of the steering wheel 500 while avoiding the obstacle 400, includes: an airbag cushion 100 deployed forward of the steering wheel 500 via a gap between the obstacle 400 and the steering wheel 500 when gas is injected; a gas injector 200 located below the airbag cushion 100, injecting the gas into the airbag cushion 100 via a gas outlet 210; and a diffuser 300 deployed in the airbag cushion 100, and covering a part or all of the gas outlet 210 from above the gas outlet 210 and being open at a front portion thereof so as to guide the gas injected via the gas outlet 210 toward the front portion of an occupant.

The steering wheel 500 is a device controlling steering of a vehicle, and may be controlled by a driver or by an electronic control unit (ECU). When the steering wheel 500 is rotated, vehicle wheels are rotated and thus being capable of steering of the vehicle. Rotation of the steering wheel 500 may be controlled by a steering motor or an auxiliary force may be generated.

As shown in FIGS. 1 to 3, the obstacle 400 may be located on the center portion of the steering wheel 500. The airbag cushion 100 may be located at a rear of the obstacle 400 and may be deployed via the gap between the steering wheel 500 and the obstacle 400 to be located in front of the occupant during deployment of the airbag cushion 100.

The gas injector 200 is located below the airbag cushion 100 and is connected to the airbag cushion 100 via the gas outlet 210, so that the gas injector 200 may inject the gas into the airbag cushion 100.

The diffuser 300 is located in the airbag cushion 100 and is deployed at a position near the gas outlet 210. Therefore, a flow of the gas may be guided, so that the gas injected from the gas outlet 210 into the airbag cushion 100 flows forward of the steering wheel 500, and the airbag cushion 100 is located in front of the occupant during deployment of the airbag cushion 100.

The diffuser 300 may guide a flow direction of the gas while a first end and a second end thereof are deployed in a deployment direction of the airbag cushion 100. The diffuser 300 may introduce the gas to flow forward of the occupant rather than toward opposite side portions of the airbag cushion 100.

Accordingly, probability of deployment of the airbag cushion 100 in front of the occupant through a rear portion of the steering wheel 500 by the gas flowing all directions during deployment of the airbag cushion 100 may be reduced. In addition, the airbag cushion 100 may be rapidly deployed forward of the occupant.

The diffuser 300 includes a first folded portion 310 formed such that, a first end of the diffuser is folded toward a second end thereof to superimpose a part or all of the diffuser above the gas outlet 210 and opposite side ends in a folded direction are combined, respectively. The first folded portion 310 is deployed toward a front portion of the airbag cushion 100 during deployment of the airbag cushion 100.

Figure 5:
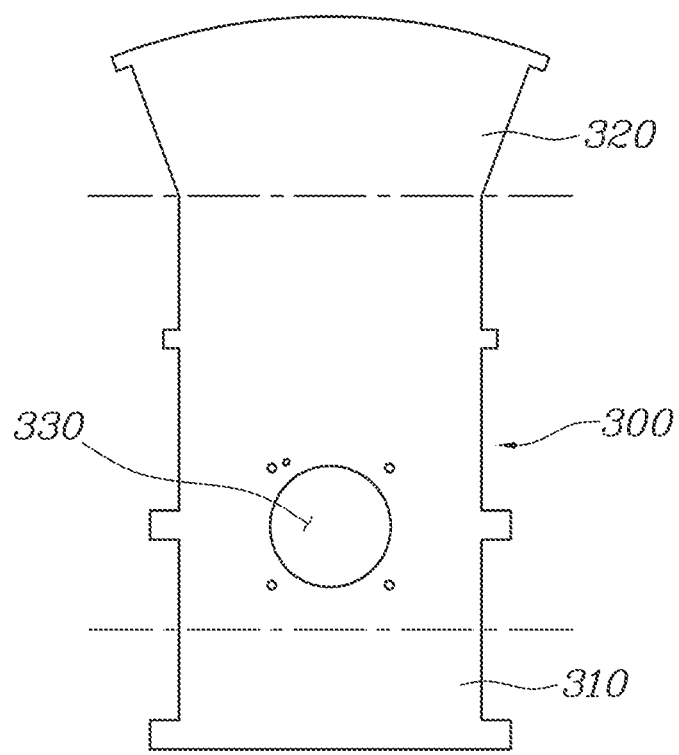
FIG. 5 is a view showing a diffuser in an unfolded state of the driver airbag apparatus for a vehicle according to the first embodiment of the present invention.
Figure 6:
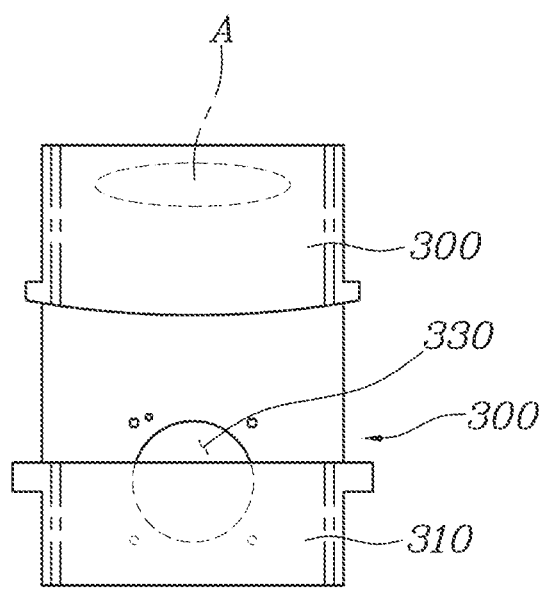
FIG. 6 is a view showing the diffuser in a folded state of the driver airbag apparatus for a vehicle according to the first embodiment of the present invention.
Figure 7:
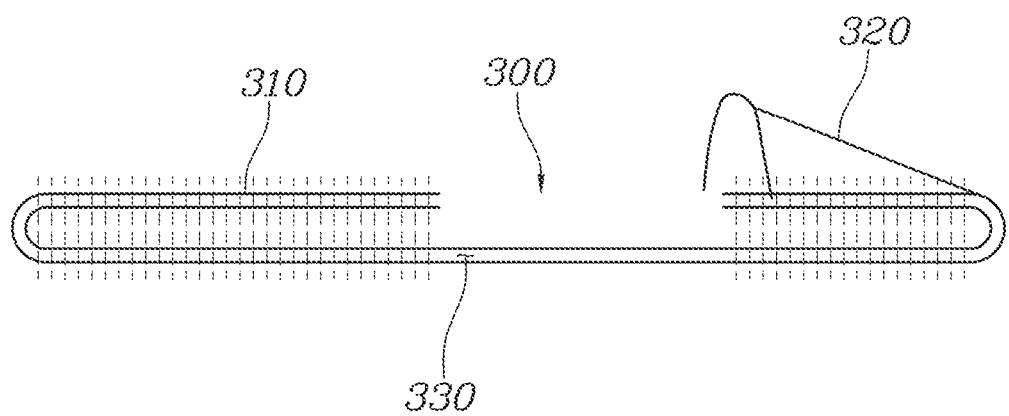
FIG. 7 is a side view of FIG. 6.

FIG. 5 is a view showing the diffuser 300 in an unfolded state of the driver airbag apparatus for a vehicle according to the first embodiment of the present invention. FIG. 6 is a view showing the diffuser 300 in a folded state of the driver airbag apparatus for a vehicle according to the first embodiment of the present invention. FIG. 7 is a side view of FIG. 6.

As shown in FIGS. 5 to 7, the first folded portion 310 is formed such that the first end of the diffuser 300 is folded toward the second end thereof and the opposite side ends thereof are combined, respectively. The first folded portion 310 may partially or entirely overlap with the gas outlet 210.

Accordingly, the gas injected from the gas injector 200 into the airbag cushion 100 may be introduced toward an upper side of the obstacle 400 rather than toward the obstacle 400 located in front of the airbag cushion 100.

The diffuser 300 includes a second folded portion 320 formed such that the second end of the diffuser is folded toward the first end thereof. The second folded portion 320 may be deployed toward an upper side of the gas outlet 210 during deployment of the airbag cushion 100.

As shown in FIGS. 5 to 7, the second folded portion 320 is located at a rear of the airbag cushion 100. The second end of the diffuser 300 is folded toward the first end thereof and the opposite side ends in the folded direction are coupled to each other. The second folded portion 320 may be deployed toward an upper portion of the airbag cushion 100 during deployment of the airbag cushion 100.

The structure described above prevents the gas injected from the gas injector 200 from flowing rearward of the airbag cushion 100, thereby preventing the airbag cushion 100 from being incorrectly deployed rearward of the steering wheel 500. In addition, as the airbag cushion 100 is rapidly deployed via the gap between the steering wheel 500 and the obstacle 400 to be located in front of the occupant, occupant injuries may be reduced.

Opposite side portions of the second folded portion 320 are expanding outward from a longitudinal direction of the diffuser, so that an end of the second folded portion 320 is extended relatively longer than a transversal length of the second folded portion 320. During deployment of the second folded portion, the second folded portion is expanded by a flow of the gas and guides a flow direction of the gas to flow forward of the occupant.

The second folded portion 320 may have the extended opposite side portions and an end extended in an arc shape, and the opposite side ends thereof may be coupled to the ends of the diffuser 300.

Therefore, the flow direction of the gas may be introduced so that the gas flowing rearward flows forward.

As shown in FIG. 5, the opposite side portions of the second folded portion 320 may be extended outward in response to the amount of the gas injected from the gas injector 200 or the volume of the airbag cushion 100.

The second folded portion 320 has the inside formed in a dome shape such that the opposite side ends thereof are combined in the folded state.

As shown in FIG. 7, the opposite side ends of the second folded portion 320 are extended outward in the longitudinal direction thereof and are combined to the diffuser 300 in the folded state, so that the inside of the opposite side portions may be formed in the dome shape.

Therefore, as the gas is injected upwardly by the gas injector 200 arranged vertically, a flow of the gas flowing into the rear of the airbag cushion 100 is prevented and the gas may flow in the deployment direction of the airbag cushion 100 along the dome shape.

The diffuser 300 includes: the first folded portion 310 formed such that, the first end of the diffuser is folded toward the second end thereof to superimpose a part or all of the diffuser above the gas outlet 210 and the opposite side portions thereof in the folded direction are combined; and the second folded portion 320 formed such that the second end thereof is folded toward the first end thereof. The end of the first folded portion 310 and the end of the second folded portion 320 are spaced apart from each other in the longitudinal direction of the diffuser.

As shown in FIGS. 3 to 4 and 6, the end of the first folded portion 310 and the end of the second folded portion 320 are spaced apart from each other. During deployment of the first and second folded portions, in order for the first folded portion 310 and the second folded portion 320 to guide a flow direction of the gas injected into the airbag cushion 100, the end of the first folded portion 310 and the end of the second folded portion 320 may be located to be spaced apart from each other.

The gas injected from the gas injector 200 flows via a gap between the end of the first folded portion 310 and the end of the second folded portion 320. Accordingly, the airbag cushion 100 may be rapidly deployed between the obstacle 400 and the steering wheel 500.

One side portion A of a second end of the diffuser 300 is connected to an upper portion of the airbag cushion 100, so that the diffuser is deployed simultaneously with deployment of the airbag cushion 100.

The diffuser 300 and the airbag cushion 100 may be deployed simultaneously when the gas is injected, as the side portion A of the second end of the diffuser 300 is connected to the upper portion or a lower portion of the airbag cushion 100.

Therefore, the gas is prevented from flowing toward the rear of the steering wheel 500 and the airbag cushion 100 may be deployed via the gap between the obstacle 400 and the steering wheel 500.

The first end of the diffuser 300 is configured, when deployed, to form a shape having a height corresponding to the height of the obstacle 400 and the second end thereof is deployed upwardly from the inside of the airbag cushion 100.

The first end of the diffuser 300 may be located to correspond to the height of the obstacle 400 during deployment of the diffuser 300.

Therefore, the gas may flow into the upper side of the obstacle 400 and the airbag cushion 100 may be deployed via the gap between the obstacle 400 and the steering wheel 500.

The diffuser 300 includes a gas inlet 330 between the first end and the second end thereof for the gas outlet 210 to be inserted into the gas inlet 330. The diffuser 300 is coupled to the airbag cushion 100 above the gas inlet 330.

The gas inlet 330 may be formed by penetrating the diffuser 300 and the gas outlet 210 may be inserted into the gas inlet 330.

Through the gas inlet 330, the gas injected from the gas outlet 210 may be injected into the airbag cushion 100 and there may be an effect that the diffuser 300 guides a flow direction of the gas injected into the airbag cushion 100.

The obstacle 400 located at the center portion of the steering wheel 500 is a display device mounted to the steering wheel 500.

As shown in FIG. 1, the obstacle 400 mounted to the center portion of the steering wheel 500 may be the display device, and may be an emblem indicating the brand of the vehicle, not the display device.

In order to prevent a damage of the display device or the emblem generated when the airbag cushion 100 hits the display device or the emblem during deployment, the airbag cushion 100 may be deployed via the gap between the display device or the emblem and the steering wheel 500 to be located in front of the occupant, and thus protecting the front of the occupant.

Figure 8:
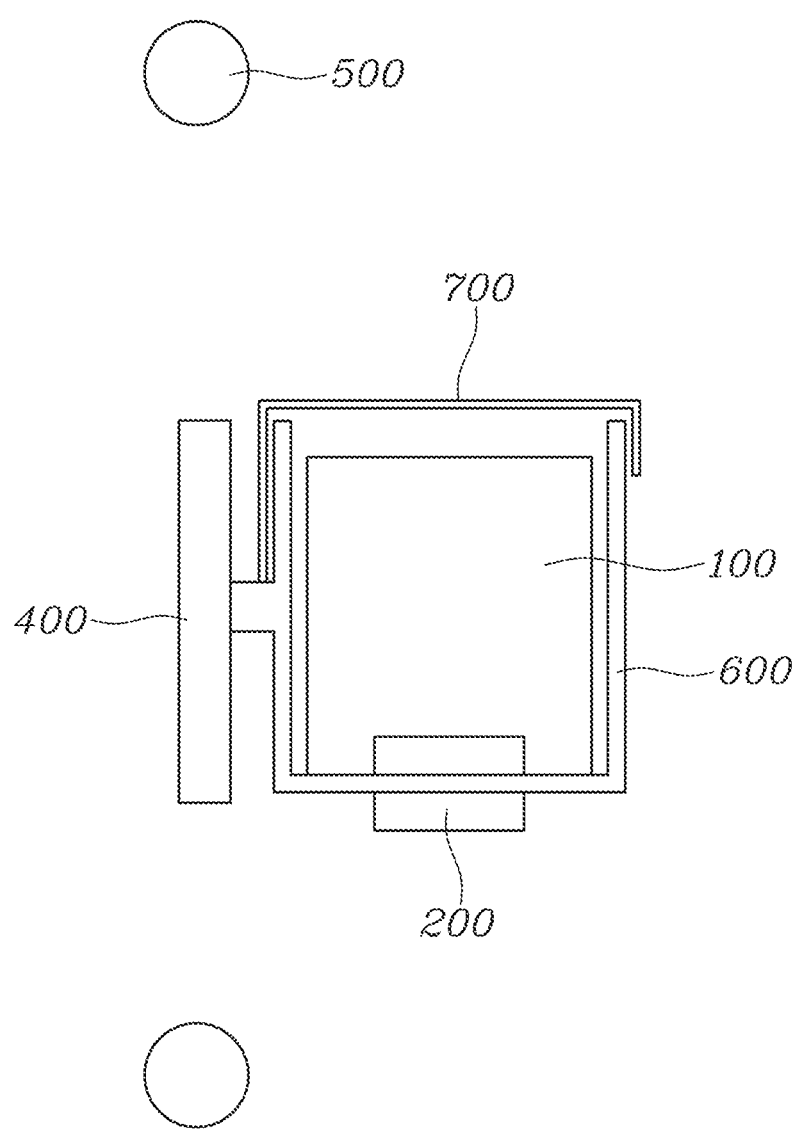
FIG. 8 is a longitudinal sectional view showing the driver airbag apparatus for a vehicle according to the embodiment of the present invention.

FIG. 8 is a longitudinal sectional view showing the driver airbag apparatus for a vehicle according to the embodiment of the present invention.

Hereinbelow, the driver airbag apparatus for a vehicle according to a preferred embodiment of the present invention will be described with reference to FIGS. 8 to 14.

According to the present invention, the driver airbag apparatus for a vehicle is deployed from the rear of the steering wheel 500 of the vehicle toward the occupant, thereby protecting the front surface of the occupant during a vehicle collision. The driver airbag apparatus for a vehicle is deployed while avoiding the obstacle 400 such that the display device mounted to the center portion of the steering wheel 500. Therefore, a damage and scattering of fragments of the obstacle 400 due to a collision with the airbag cushion 100 during deployment of the airbag cushion 100 is prevented.

The driver airbag apparatus for a vehicle according to the present invention, the driver airbag apparatus being deployed from the rear of the steering wheel 500 having the obstacle 400 at the center portion of the steering wheel toward the front side of the steering wheel 500 while avoiding the obstacle 400, the driver airbag apparatus includes: an airbag housing 600 located at the rear of the steering wheel 500; the airbag cushion 100 stored in the airbag housing 600, and deployed forward of the steering wheel 500 via the gap between the obstacle 400 and the steering wheel 500 when the gas is injected therein; and an airbag cover 700 located above the airbag housing 600 to cover an upper surface of the airbag housing 600, configured such that a front end thereof is rotated upwardly on a rear end thereof during deployment of the airbag cushion 100, and including sidewalls 740 extended downward from both sides thereof in order to prevent sideways deployment of the airbag cushion 100.

Figure 9:
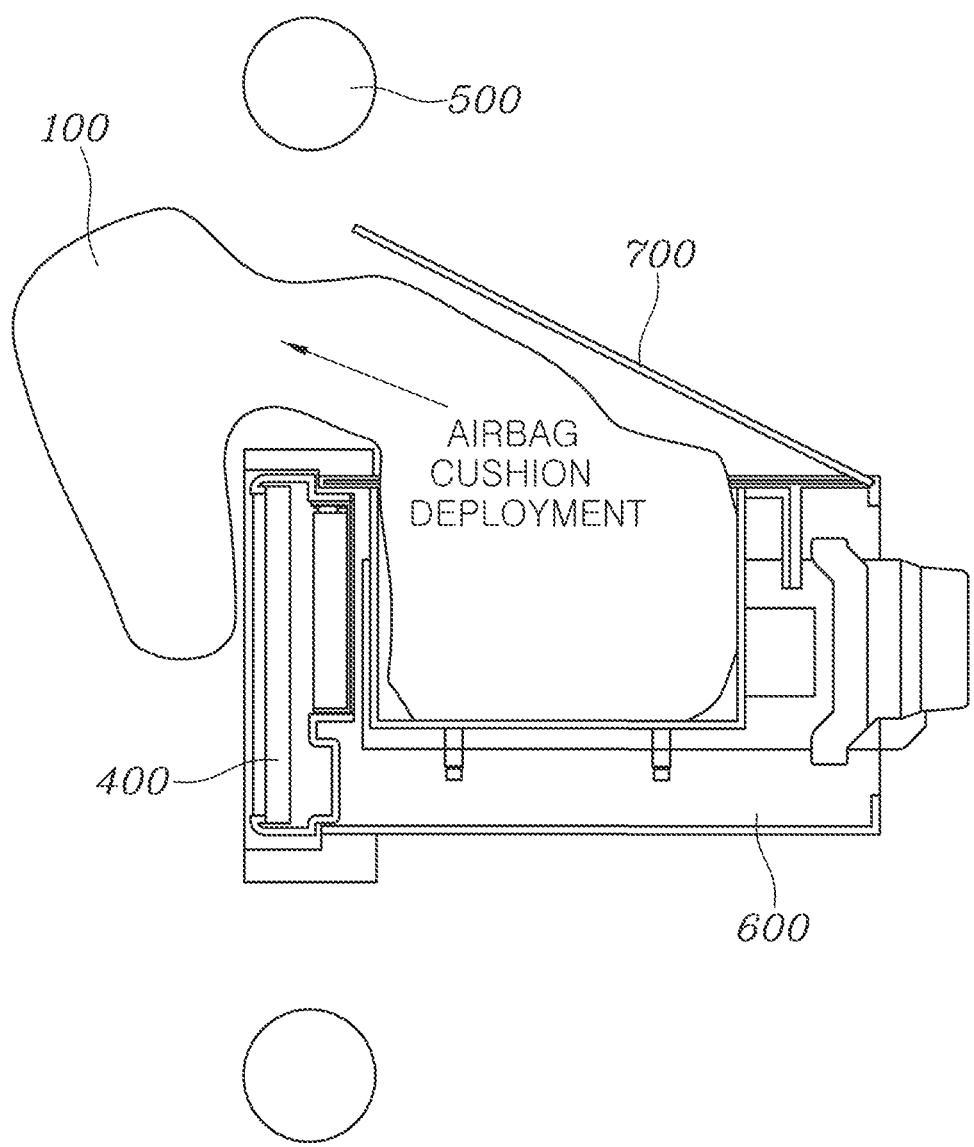
FIG. 9 is a longitudinal sectional view showing an airbag cushion in a deployment state of the driver airbag apparatus for a vehicle according to the embodiment of the present invention.

As shown in FIGS. 1 and 8 to 9, the airbag housing 600 may be located at the rear of the steering wheel 500 and be coupled to the steering wheel 500. The airbag cushion 100 is located in the airbag housing 600. The airbag cushion 100 may be deployed outward from the inside of the airbag housing 600 via the gap between the steering wheel 500 and the obstacle 400, and be located in front of the occupant.

The airbag cover 700 is located above the airbag housing 600. The airbag cover 700 covers the airbag cushion 100 in the airbag housing 600. When the airbag cushion 100 is deployed, the airbag cover 700 is opened at the front end thereof at the occupant, and the front end of the airbag cover 700 is rotated upwardly on the rear end thereof, whereby the airbag cushion 100 may be deployed toward the occupant.

The sidewalls 740 are formed by being extended downward from both side portions of the airbag cover 700. Accordingly, the sidewalls 740 are rotated together with the airbag cover 700 during deployment of the airbag cushion 100 and sideways deployment of the airbag cushion 100 is prevented.

Accordingly, when the airbag cushion 100 is deployed, the sideways deployment of the airbag cushion 100 due to the nature of the gas flowing in all directions when being injected into the airbag cushion 100 is prevented by the sidewalls 740. The airbag cushion 100 may be rapidly deployed toward the occupant.

Figure 10:
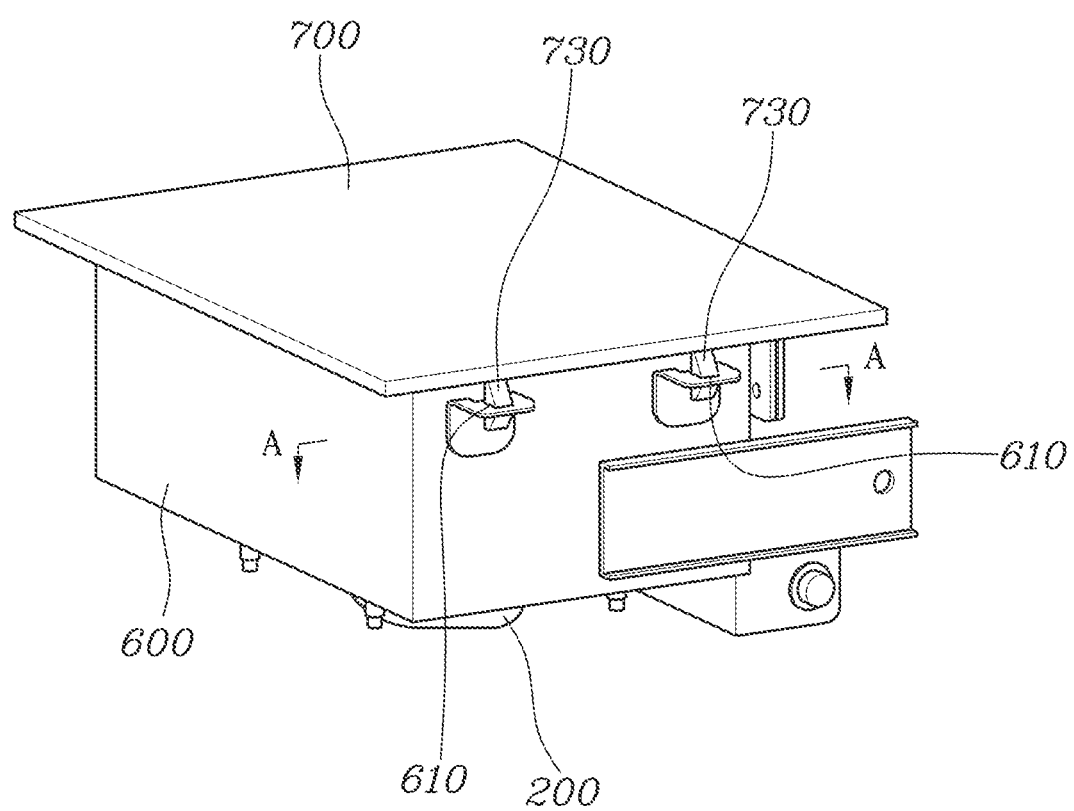
FIG. 10 is a perspective view showing the driver airbag apparatus for a vehicle according to the embodiment of the present invention.
Figure 11:
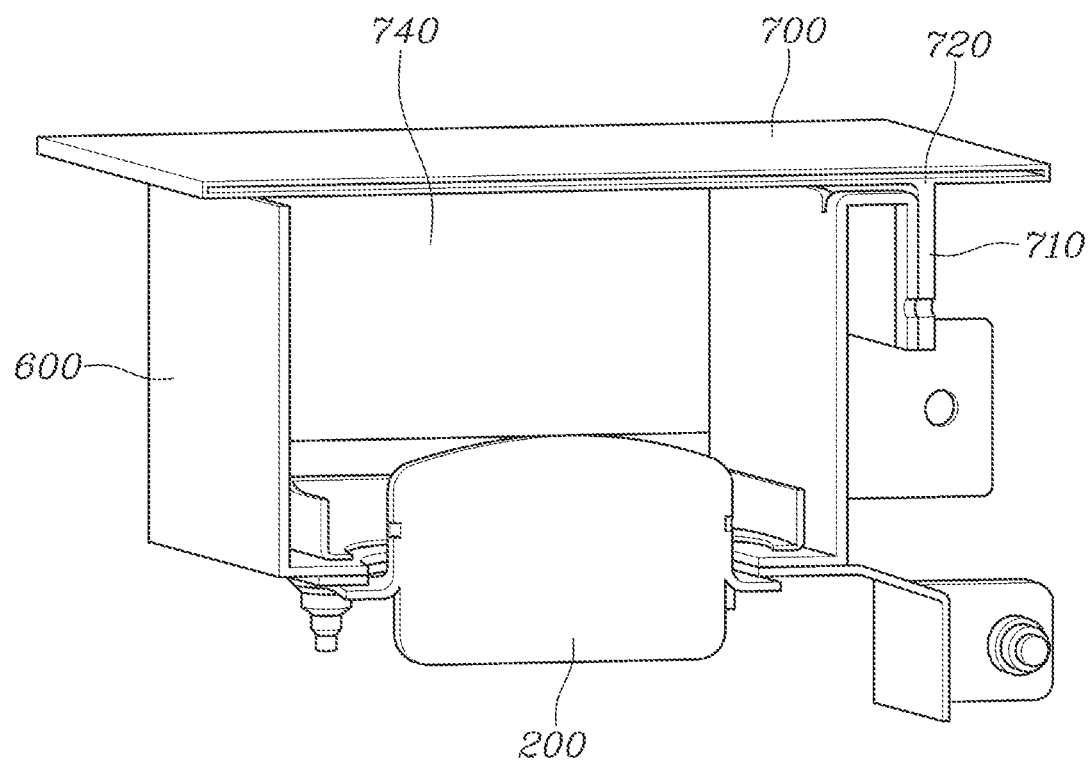
FIG. 11 is a perspective view taken along line A-A in FIG. 10.

FIG. 10 is a perspective view showing the driver airbag apparatus for a vehicle according to the embodiment of the present invention. FIG. 11 is a perspective view taken along line A-A in FIG. 10.

The airbag cover 700 includes a coupling portion 710 extended downward from a rear end of the airbag cover and coupled to the airbag housing 600.

As shown in FIG. 11, the coupling portion 710 is extended downward from the rear end of the airbag cover 700 and is coupled to the airbag housing 600, whereby the airbag cover 700 may be fixed to the airbag housing 600.

The coupling portion 710 is coupled to the airbag housing by a coupling method such as bolting or by a coupling method configured such that the coupling portion 710 is securely inserted into a coupling groove (not shown) provided in the airbag housing 600.

The airbag cover 700 includes a hinge portion 720. The hinge portion is located at an upper end portion of the coupling portion 710, and rotates the airbag cover 700 to allow the front end of the airbag cover 700 to be moved upwardly during deployment of the airbag cushion 100.

As shown in FIG. 11, the hinge portion 720 may be provided at the rear end portion of the airbag cushion 100, and rotates the airbag cover 700 such that the front end of the airbag cover 700 is rotated on the rear end thereof during deployment of the airbag cushion 100.

Therefore, the front end of the airbag cover 700 may be easily rotated upwardly, the rear end of the airbag cover 700 is fixed during deployment of the airbag cushion 100, thereby preventing the airbag cushion 100 from being deployed rearward.

The sidewalls 740 are rotated with respect to the airbag housing 600 in an insertion state into the airbag housing 600. Interference between the sidewalls and the airbag housing 600 is prevented when the sidewalls are rotated relative to the airbag housing 600.

Figure 12:
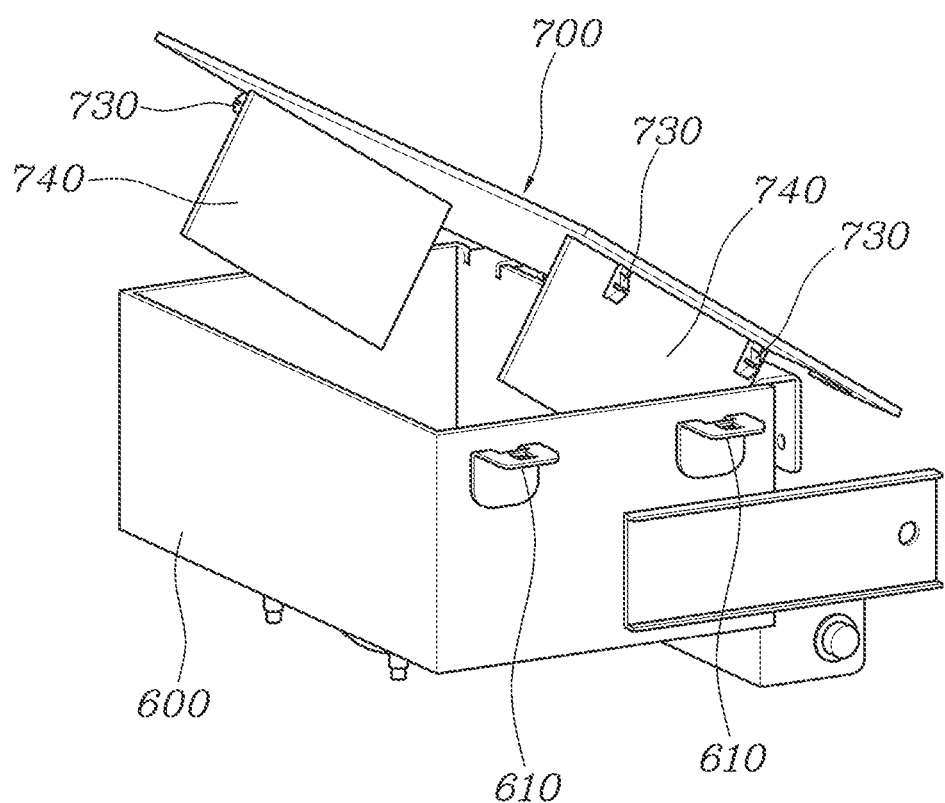
FIG. 12 is a perspective view showing an airbag cover in an open state of the driver airbag apparatus for a vehicle according to the embodiment of the present invention.

As shown in FIG. 12, while the airbag cover 700 and the airbag housing 600 are coupled to each other, the sidewalls 740 are inserted into the airbag housing 600. When the airbag cushion 100 is deployed, the sidewalls 740 are rotated with rotation of the airbag cover 700. The length of the sidewalls 740 may be formed to avoid interference therebetween and the airbag housing 600 during rotation of the sidewalls 740.

Accordingly, interference between the sidewalls 740 and the airbag housing 600 is prevented when the front end of the airbag cover 700 is opened, and the front end of the airbag cover is rotated upwardly on the rear end thereof.

Figure 13:
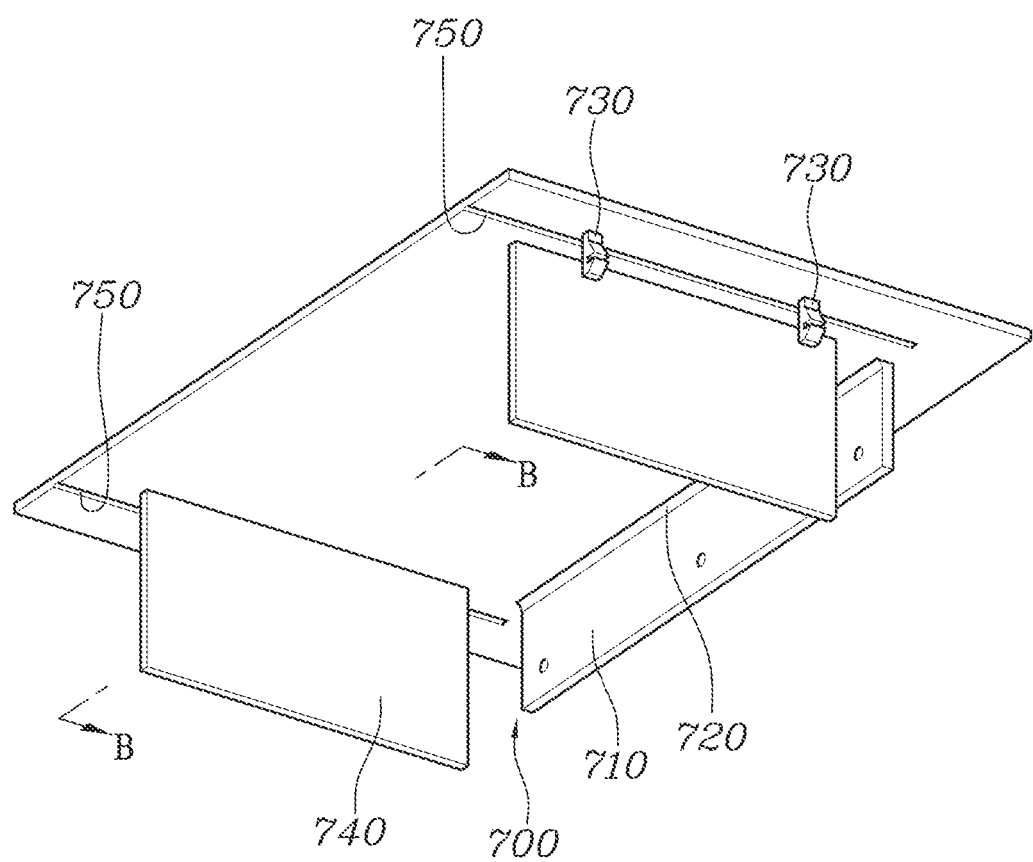
FIG. 13 is a bottom perspective view showing the airbag cover of the driver airbag apparatus for a vehicle according to the embodiment of the present invention.
Figure 14:
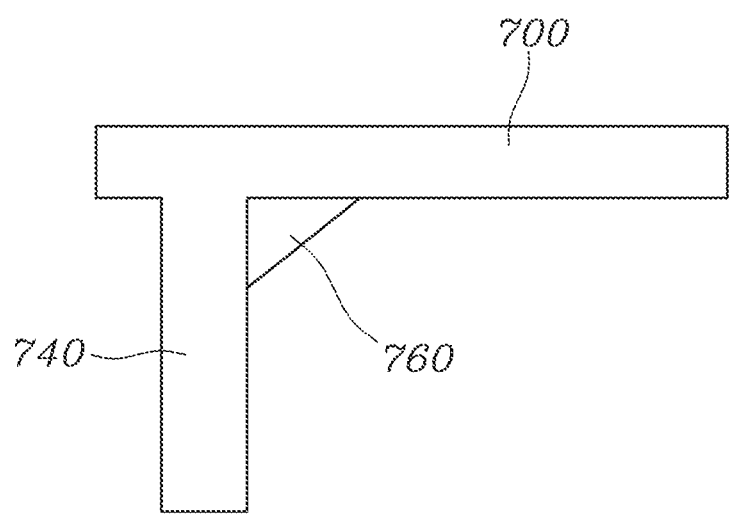
FIG. 14 is a view taken along line B-B in FIG. 13.

FIG. 13 is a bottom perspective view showing the airbag cover 700 of the driver airbag apparatus for a vehicle according to the embodiment of the present invention. FIG. 14 is a perspective view taken along line B-B in FIG. 13.

The airbag cover 700 includes a reinforcement portion 760 reinforcing coupling between the sidewalls 740 and the airbag cover 700.

As shown in FIG. 14, the reinforcement portion 760 is provided on an inside portion of the airbag cover 700 and the sidewalls 740. The reinforcement portion 760 may connect the airbag cover 700 to the sidewalls 740.

Therefore, the sidewalls 740 preventing sideways deployment of the airbag cushion 100 is prevented from being damaged.

The airbag cover 700 prevents the airbag cushion 100 from being deployed rearward of the steering wheel 500, and guides the airbag cushion 10 to be deployed forward of the steering wheel 500.

As shown in FIG. 12, as the airbag cover 700 is opened at the front end thereof and the front end thereof is rotated upwardly on the rear end thereof during deployment of the airbag cushion 100, the rear portion of the airbag cover may be closed.

Therefore, the airbag cushion 100 is prevented from being deployed toward a front portion of the vehicle and the airbag cushion 100 may be rapidly deployed toward the occupant.

The airbag cover 700 includes a tear line 750 extended in the longitudinal direction of the vehicle, and located outside the sidewalls 740, so that the airbag cover 700 is cut during deployment of the airbag cushion 100.

As shown in FIG. 13, the tear line 750 may be formed each side of the airbag cover 700 and may be located outside the sidewalls 740. The tear line 750 may be cut so that the front end of the airbag cover 700 is rotated upwardly on the rear end thereof during deployment of the airbag cushion 100.

Therefore, the airbag cover 700 may be rapidly deployed upwardly during deployment of the airbag cushion 100.

The airbag cover 700 includes locking protrusions 730 located on an outer surface of the sidewalls 740 and extended downward and of which an end protrudes outward. The airbag housing 600 includes locking grooves 610 for the locking protrusions 730 to be inserted into the locking grooves 610. The locking protrusions 730 are inserted into the locking grooves 610 to fix the airbag cover, and the locking protrusions 730 and the locking grooves 610 are released from a coupled state during deployment of the airbag cushion 100.

As shown in FIG. 10, the locking protrusions 730 may be extended downward from both side portions of the airbag cover 700 and located outside the airbag housing 600. The locking grooves 610 may be formed on the airbag housing 600 and be located on portions corresponding to the locking protrusions 730 for the locking protrusions 730 to be inserted therein.

The locking protrusions 730 may be inserted into the locking grooves 610, so that both side portions of the airbag cover 700 are temporarily coupled to the airbag housing 600. Temporary coupling between the locking protrusions 730 and the locking grooves 610 may be released during deployment of the airbag cushion 100.

Therefore, the airbag cover 700 may be rotated upwardly during deployment of the airbag cushion 100, and the airbag cover 700 may be reused after the deployment and thus having an effect of cost reduction.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A driver airbag apparatus for a vehicle, the driver airbag apparatus being located at a rear of a steering wheel having an obstacle at a center portion of the steering wheel and configured to deploy toward a front of the steering wheel while avoiding the obstacle, the driver airbag apparatus comprising:
   an airbag cushion configured to inflate and deploy toward a front of a driver of the vehicle via a gap between the obstacle and the steering wheel when a gas is supplied to the airbag cushion;
   a gas injector located below the airbag cushion and configured to supply the gas into the airbag cushion via a gas outlet; and
   a diffuser configured to inflate and deploy within the airbag cushion when the gas is supplied to the diffuser, the diffuser at least partially covering the gas outlet, having an opening at a front portion of the diffuser, and configured to guide the gas supplied from the gas injector via the gas outlet toward the front of the driver of the vehicle.

2. The driver airbag apparatus of claim 1, wherein:
   the diffuser has first and second end portions, and the first end portion of the diffusor is folded toward the second end portion of the diffuser to form a first folded portion, and
   the first folded portion is configured to deploy toward a front portion of the airbag cushion when the gas is supplied to the diffuser.

3. The driver airbag apparatus of claim 2, wherein:
   the second end portion of the diffuser is folded toward the first end of the diffuser to form a second folded portion, and
   the second folded portion is configured to deploy upwardly when the gas is supplied to the diffuser.

4. The driver airbag apparatus of claim 3, wherein the second end portion of the diffuser has first and second side portions expanding outward with respect to a longitudinal direction of the diffuser.

5. The driver airbag apparatus of claim 4, wherein the second folded portion has an inner space having a dome shape.

6. The driver airbag apparatus of claim 1, wherein the diffuser comprises:
   a first folded portion located at a first end of the diffuser and at least partially overlapping the gas outlet; and
   a second folded portion located at a second end of the diffuser and spaced apart from the first folded portion of the diffuser.

7. The driver airbag apparatus of claim 1, wherein the diffuser has a portion connected to an upper portion of the airbag cushion.

8. The driver airbag apparatus of claim 1, wherein the diffuser comprises:
   a first end portion configured to form, when deployed, a shape having a first height corresponding to a second height of the obstacle; and
   a second end portion configured to deploy upwardly within the airbag cushion.

9. The driver airbag apparatus of claim 1, wherein:
   the diffuser has a gas inlet located between first and second end portions thereof,
   the gas outlet is connected to the gas inlet, and
   the diffuser has a portion coupled to an upper portion of the airbag cushion.

10. The driver airbag apparatus of claim 1, wherein the obstacle comprises a display device mounted to the steering wheel.

11. A driver airbag apparatus for a vehicle, the driver airbag apparatus being located at a rear of a steering wheel having an obstacle at a center portion of the steering wheel and configured to deploy toward a front of the steering wheel while avoiding the obstacle, the driver airbag apparatus comprising:
   an airbag cushion configured to deploy toward a front of a driver of the vehicle via a gap between the obstacle and the steering wheel when a gas is supplied to the airbag cushion;
   a gas injector located below the airbag cushion and configured to supply the gas into the airbag cushion via a gas outlet;
   a diffuser configured to deploy within the airbag cushion when the gas is supplied to the diffuser, the diffuser at least partially covering the gas outlet, having an opening at a front portion of the diffuser, and configured to guide the gas supplied from the gas injector via the gas outlet toward the front of the driver of the vehicle;
   an airbag housing located at the rear of the steering wheel and having an inner storage space for storing the airbag cushion and a top opening exposing the inner storage space; and
   an airbag cover configured to cover the top opening of the airbag housing and having a front end configured to rotate upwardly with respect to a rear end thereof when the airbag cushion is deployed, the airbag cover comprising a pair of sidewalls extending vertically on both sides of the airbag housing, respectively.

12. The driver airbag apparatus of claim 11, wherein the airbag cover further comprises a coupling portion configured to couple the rear end of the airbag cover and the airbag housing.

13. The driver airbag apparatus of claim 12, wherein the airbag cover further comprises a hinge portion located at an upper portion of the coupling portion and configured to rotate the airbag cover to allow the front end of the airbag cover to move upwardly when the airbag cushion is deployed.

14. The driver airbag apparatus of claim 11, wherein the sidewalls are configured to prevent an interference between the sidewalls and the airbag housing when the airbag cover rotates.

15. The driver airbag apparatus of claim 11, wherein the airbag cover further comprises a reinforcement portion configured to reinforce a coupling between the pair of sidewalls and the airbag cover.

16. The driver airbag apparatus of claim 11, wherein the airbag cover is configured to prevent the airbag cushion from deploying away from the front of the driver of the vehicle.

17. The driver airbag apparatus of claim 11, wherein the airbag cover further comprises a tear line extending in a longitudinal direction of the vehicle.

18. The driver airbag apparatus of claim 11, wherein:
the airbag cover further comprises a locking protrusion located on an outer surface of the sidewall,
airbag housing comprises a locking groove configured to engage the locking protrusion, and
the locking protrusion is disengaged from the locking groove when the airbag cushion is deployed.

* * * * *